United States Patent
Aoki

(10) Patent No.: US 10,917,832 B2
(45) Date of Patent: Feb. 9, 2021

(54) COMMUNICATION DEVICE, COMMUNICATION METHOD, AND PROGRAM

(71) Applicant: CANON KABUSHIKI KAISHA, Tokyo (JP)

(72) Inventor: Hitoshi Aoki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/353,997

(22) Filed: Mar. 14, 2019

(65) Prior Publication Data

US 2019/0215758 A1 Jul. 11, 2019

Related U.S. Application Data

(63) Continuation of application No. PCT/JP2017/030970, filed on Aug. 29, 2017.

(30) Foreign Application Priority Data

Sep. 15, 2016 (JP) .................. 2016-180325

(51) Int. Cl.
*H04W 48/08* (2009.01)
*H04W 84/12* (2009.01)
(Continued)

(52) U.S. Cl.
CPC ............. *H04W 48/08* (2013.01); *H04L 67/28* (2013.01); *H04W 48/10* (2013.01); *H04W 56/001* (2013.01); *H04W 68/005* (2013.01); *H04W 76/10* (2018.02); *H04W 84/12* (2013.01); *H04W 84/20* (2013.01); *H04W 92/18* (2013.01)

(58) Field of Classification Search
CPC ..... H04W 48/08; H04W 92/18; H04W 84/20; H04W 48/10; H04W 76/10; H04W 56/001; H04W 68/005; H04W 84/12; H04W 8/005; H04W 48/16; H04L 67/28
See application file for complete search history.

(56) References Cited

U.S. PATENT DOCUMENTS

2014/0254569 A1 9/2014 Abraham
2014/0302787 A1 10/2014 Rantala
(Continued)

FOREIGN PATENT DOCUMENTS

CN 105557001 A 5/2016
CN 105580400 A 5/2016
(Continued)

*Primary Examiner* — Steven H Nguyen
(74) *Attorney, Agent, or Firm* — Canon U.S.A., Inc. I.P. Division

(57) ABSTRACT

A communication device performs processing of transmission and reception of wireless signals in a period of a predetermined length, which arrives at a predetermined time interval, processing of requesting a particular communication device, belonging to a group of a plurality of communication devices that are synchronized regarding the period, for proxy regarding at least one processing of transmission and reception of wireless signals in the period, and processing of deciding whether or not to perform a request for proxy, in accordance with a frequency of the period in which the communication means performing transmission and reception of wireless signals, out of a plurality of the periods.

12 Claims, 11 Drawing Sheets

(51) Int. Cl.
*H04W 92/18* (2009.01)
*H04W 84/20* (2009.01)
*H04W 48/10* (2009.01)
*H04W 76/10* (2018.01)
*H04L 29/08* (2006.01)
*H04W 56/00* (2009.01)
*H04W 68/00* (2009.01)

(56) References Cited

U.S. PATENT DOCUMENTS

| | | | |
|---|---|---|---|
| 2015/0063189 A1* | 3/2015 | Merlin | H04W 72/042 370/312 |
| 2015/0081840 A1 | 3/2015 | Patil | |
| 2015/0350866 A1 | 12/2015 | Patil | |
| 2016/0014669 A1* | 1/2016 | Patil | H04W 40/246 370/329 |
| 2016/0014715 A1* | 1/2016 | Patil | H04W 52/0216 370/329 |
| 2016/0226928 A1* | 8/2016 | Park | H04W 4/06 |
| 2016/0270137 A1* | 9/2016 | Yong | H04W 8/005 |
| 2016/0352782 A1* | 12/2016 | Patil | H04L 67/16 |
| 2017/0150337 A1* | 5/2017 | Bareket | H04L 67/104 |
| 2018/0139600 A1* | 5/2018 | Kim | H04W 56/0015 |
| 2019/0098680 A1* | 3/2019 | Park | H04W 76/14 |

FOREIGN PATENT DOCUMENTS

| | | |
|---|---|---|
| CN | 105637907 A | 6/2016 |
| JP | 2013187703 A | 9/2013 |
| WO | 2015073676 A1 | 5/2015 |
| WO | 2015187360 A1 | 12/2015 |

\* cited by examiner

| REMAINING BATTERY CHARGE | FREQUENCY OF RECEPTION DW |
|---|---|
| 100% - 70% | DW0 - DW15 |
| 69% - 50% | DW0/DW2/DW4/DW6/DW8/DW10/DW12/DW14 |
| 49% - 30% | DW0/DW4/DW8/DW12 |
| 29% - 1% | DW0 |

COMMUNICATION DEVICE, COMMUNICATION METHOD, AND PROGRAM

CROSS-REFERENCE TO RELATED APPLICATIONS

This application is a Continuation of International Patent Application No. PCT/JP2017/030970, filed Aug. 29, 2017, which claims the benefit of Japanese Patent Application No. 2016-180325, filed Sep. 15, 2016, both of which are hereby incorporated by reference herein in their entirety.

TECHNICAL FIELD

The present invention relates to communication technology.

BACKGROUND ART

In recent years, wireless local access network (LAN), represented by the IEEE 802.11 standard series, has come into widespread use. In many cases, the network of a wireless LAN is controlled by a base station called an access point (AP). A wireless network is configured of this AP, and a station (STA) in a wirelessly-connected state that exists within a radio wave arrival range of the AP.

Also, in addition to simple wireless network configuration by such conventional APs and STAs, products and specification standards for various wireless LAN network forms have emerged. PTL 1 describes Neighbor Awareness Networking (NAN) stipulated by the Wi-Fi Alliance as a standard for discovering communication devices and services and the like provided thereby, with low electric power consumption. This is an arrangement where a communication device synchronizes with another communication device regarding a period for exchanging information with that other communication device, thereby shortening the time where a wireless radio frequency (RF) unit is effective, thereby conserving electric power. This period for synchronizing in NAN is called a Discovery Window (DW). A collection of NAN devices sharing a predetermined synchronization period is called a NAN cluster. Out of the NAN devices, terminals having roles called Master and Non-Master Sync transmit a Sync Beacon, which is a signal to secure synchronization among terminals during the DW periods. Upon having established synchronization with other terminals, NAN devices transmit and receive Subscribe messages that are signals for discovering services, and Publish messages that are signals notifying that a service is being provided, and so forth, in the DW periods. Further, NAN devices can transmit and receive Follow-up messages for exchanging additional information relating to services, in the DW periods. On the other hand, NAN devices can also enter a doze state where wireless signals are not received during part of the DW periods, and thereby further reduce electric power consumption.

NAN devices can discover and detect services within a NAN cluster. Further, a NAN device may establish a Post-NAN in a case of communicating with an application that executes a service, after having discovered and detected the service. A PostNAN is a network separate from the NAN cluster, i.e., a network separate from the NAN, such as an infrastructure network of a wireless LAN, an ad hoc network, Wi-Fi Direct, or the like. NAN devices can perform communication by application by establishing a PostNAN network.

The frequency of DW periods to receive wireless signals out of the DW periods depends on the NAN device. Note however, that all NAN devices participating in a NAN cluster need to be in a state where wireless signals can be received (hereinafter, an awake state) without fail during a special DW period called DW0. DW0 is a DW period that arrives at a cycle of once out of 16 DW periods. Also, DW0 is a DW period that starts from a point in time where the lower order 23 bits of a time synchronization function (TSF), which is a counter timer that the NAN cluster uses for synchronization, is 0x0. A NAN device that functions as Master and Non-Master Sync needs to transmit a Sync Beacon each DW period, and accordingly can receive wireless signals in all DW periods.

On the other hand, a NAN device that does not transmit a Sync Beacon each DW period operates as a Non-Master Non-Sync and does not need to be in the awake state during all DW periods, so it is sufficient to be in the awake state during the DW0 at the least.

Proposal is being made for a method where other communication devices are commissioned to search for or provide services, so that services of a communication device at a range where own wireless signals cannot reach, can be discovered, or conversely, the own device can be discovered by others (PTL 2). In PTL 2, a communication device on the side of commissioning proxy (hereinafter Proxy Client) make notification of information regarding services it provides, to a communication device on the side of being commissioned with standing in proxy (hereinafter Proxy Server). Upon being commissioned to stand in proxy, the Proxy Server makes notification in response to queries regarding services from other communication device, of the existence of the services in proxy for the Proxy Client. At this time, making notification of information regarding services and the periods when the Proxy Client is awake enables the other communication devices to detect the existence of services based on this information. In a case where the Proxy Client is at a distance where communication can be performed, the services can be detected by making notification of a message to the Proxy Client during the period that the Proxy Client is awake.

In a case where another NAN device transmits a Subscribe or Publish during a period during which the Proxy Client that has commissioned the proxy response is capable of wireless communication, there is a possibility that both the Proxy Server and the Proxy Client will respond. A DW is an extremely short communication period of 16 TU, so if multiple NAN devices redundantly respond, this wastefully uses wireless band.

The present invention has been made in light of the above-described problem, and it is an object thereof to provide technology for using wireless band more efficiently.

CITATION LIST

Patent Literature

PTL 1 U.S. Patent Application Publication No. 2014/0302787

PTL 2 U.S. Patent Application Publication No. 2015/0081840

SUMMARY OF INVENTION

In order to solve the above-described problem, a communication device according to the present invention includes: communication means configured to perform transmission and reception of wireless signals in a period of a predetermined length, which arrives at a predetermined time interval; requesting means configured to request a particular communication device, belonging to a group of a plurality of communication devices that are synchronized regarding the period, for proxy regarding at least one processing of transmission and reception of wireless signals in the period; and deciding means configured to decide whether or not to perform a request by the requesting means, in accordance with a frequency of the period in which the communication means perform transmission and reception of wireless signals, out of a plurality of the periods.

Also, a communication device according to the present invention includes: communication means configured to participate in a NAN cluster in Wi-Fi Neighbor Awareness Networking, and transmit and receive wireless signals in a Discovery Window period in the NAN cluster; and control means configured to effect control to commission a Proxy Server in the NAN cluster to perform proxy processing in a case where a role of the communication device itself in the NAN cluster is Non-Master Non-Sync, and not to commission a Proxy Server in the NAN cluster to perform proxy processing in a case where the role of the communication device itself in the NAN cluster is Master.

Further features of the present invention will become apparent from the following description of exemplary embodiments with reference to the attached drawings.

DESCRIPTION OF EMBODIMENTS

Figure 1:
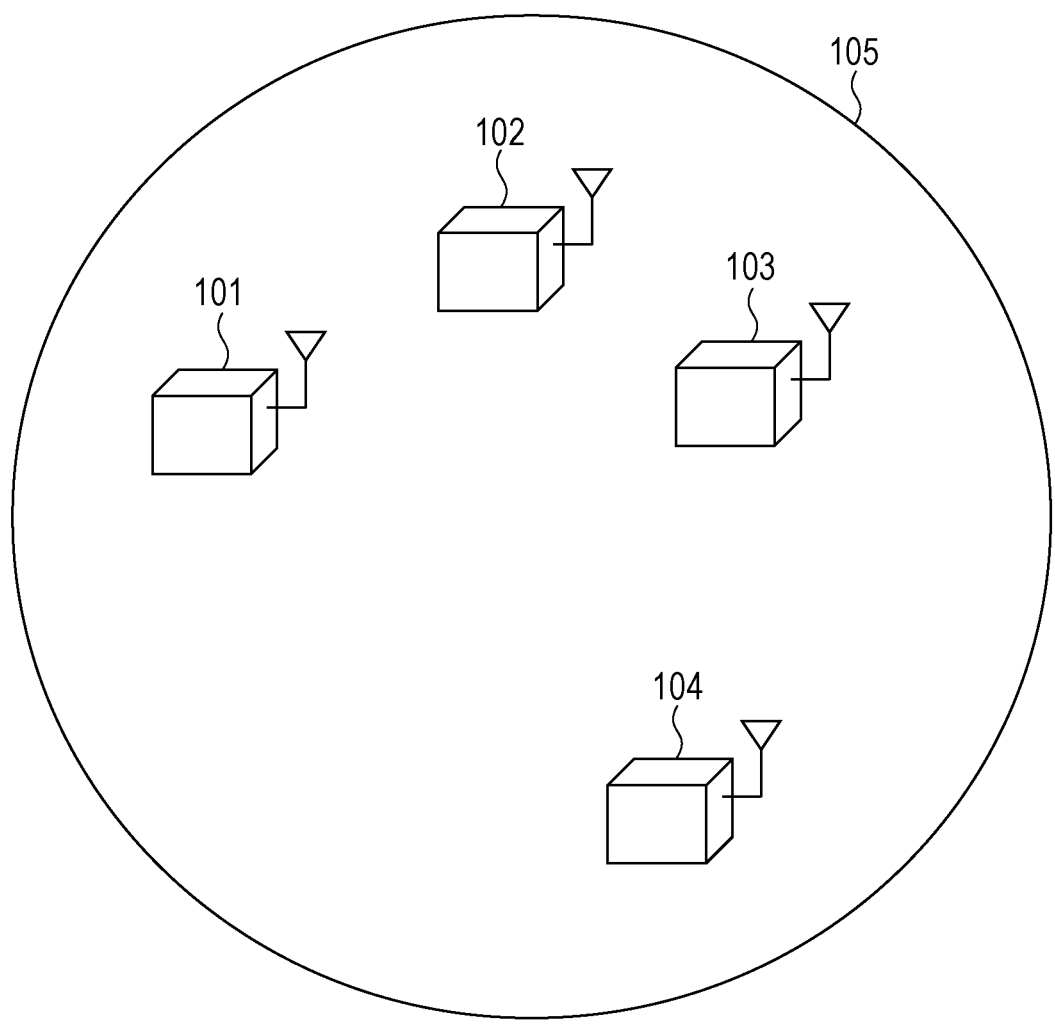
FIG. 1 is a diagram illustrating a configuration example of a wireless communication system.

An example of an embodiment of the present invention will be described below with reference to drawings. Note that while the following description is made regarding an arrangement where the communication devices are terminals having wireless LAN communication functions conforming to the IEEE 802.11 standard series, this is not restrictive. Also, while the following description is made regarding an arrangement where the communication devices are NAN devices capable of discovering other communication devices and services provided thereby by Wi-Fi Neighbor Awareness Networking (NAN), this not restrictive, either. That is to say, technical terms corresponding to a predetermined standard are used in the following descriptions, but the following discussions can be applied to other standards of the same type.

NAN will be described. In NAN, communication of service information is made during periods called Discovery Window (hereinafter referred to as DW). A DW is a time and channel where multiple devices executing NAN converge. A collection of terminals sharing a DW schedule is called a NAN cluster.

Each of the terminals belonging to a NAN cluster operate under one of the roles of Master, Non-Master Sync, and Non-Master Non-Sync. A terminal operating as a Master transmits a Synchronization Beacon (hereinafter referred to as Sync Beacon) which is a beacon for the terminals to be able to identify DWs and synchronize. A terminal operating as a Master also transmits a Discovery Beacon, which is a signal for causing terminals that do not belong to the NAN cluster to recognize this NAN cluster. A Discovery Beacon is transmitted outside of DW periods, every 100 TU (Time Unit, 1 TU is 1024 µseconds). At least one terminal operates as a Master in each NAN cluster.

A terminal that operates as a Non-Master Sync transmits a Sync Beacon but does not transmit a Discovery Beacon. A terminal that operates as a Non-Master Non-Sync transmits neither a Sync Beacon nor a Discovery Beacon.

The likeliness of becoming a Master, Non-Master Sync, or Non-Master Non-Sync in a NAN cluster is decided based on a Master Rank stipulated by the NAN standard. Specifically, the Master Rank is decided by the following Expression from a Master Preference set to each NAN device, a Random Factor that is a random value, and a MAC in an interface address. Master Rank=Master Preference*2^56+Random Factor*2^48+MAC[5]*2^40+ . . . +MAC[0]. The higher the Master Rank of a NAN device is, the more likely it is to take on the role of Master, and the lower the Master Rank of a NAN device is, the more likely it is to become a Non-Master Non-Sync. Particularly, the NAN device that has the highest Master Rank in the NAN cluster is called an Anchor Master, and is a device serving as the reference for time in the NAN cluster. It is recommended in the NAN standard that the Master Rank is increased for NAN devices that participate in the NAN cluster in a stable manner, e.g., a NAN device that runs off of a power source and does not relocate. It is also recommended NAN devices that run on batteries or may not be present in the NAN cluster in a stable manner, such as mobile terminals or the like, have a small Master Rank. Having a NAN device that remains in a stable manner to be a Master and transmit synchronization signals enables the NAN cluster to be maintained in a stable manner.

Terminals that participate in a NAN cluster synchronize with the DW periods at predetermined cycles following a Sync Beacon, and communicate service information in the DW periods.

The terminals communicate with each other Subscribe messages that are signals for detecting services in DW periods, and Publish messages that are signals for notifying providing of a service. Further, the terminals can exchange Follow-up messages to exchange additional information relating to services in the DW periods. Note that messages such as Publish, Subscribe, and Follow-up are collectively referred to as Service Discovery Frame (SDF). The terminals can advertise or detect services by exchanging SDFs.

As described above, NAN devices can suppress electric power consumption by going to a doze state even during DW periods, in which state wireless signals are not transmitted or received. On the other hand, such NAN devices cannot transmit or receive Subscribe messages or Publish messages in a DW period when in a doze state. Accordingly, the period until another NAN device discovers the service that this NAN device provides may become longer.

Conversely, some NAN device may be able to commission another NAN device to perform detection and notification of services, such as Subscribe and Publish and so forth. A particular NAN device that performs proxy processing for searching and annunciation of services for another NAN device is referred to as a Proxy Server here, and a particular NAN device that commissions another NAN device to perform proxy processing is referred to as a Proxy Client. In a case of being commissioned by a Proxy Client to perform proxy transmission of service information, the Proxy Server performs proxy transmission of service information of the Proxy Client. The Proxy Server executing search and annunciation of services instead of the Proxy Client enables the Proxy Client to be in doze for a longer period, thus enabling marked reduction in electric power consumption. Also, there are cases where a NAN device is searching for a service that a Proxy Client provides, and if a Subscribe message is transmitted when the Proxy Client is in a doze state, the Proxy Server may respond. Accordingly, the probability that the service provided by the Proxy Client can be discovered by a NAN device even though the Proxy Client is in a doze state is increased, due to the Proxy Server responding in proxy.

However, if the Proxy Server executes searching and annunciation of services in proxy even though the Proxy Client is capable, redundant messages will be transmitted. Consequently, the wireless band is wastefully used, and the usage efficiency of the wireless band may deteriorate.

Accordingly, in the present embodiment, in a case where a NAN device operates as a Master or Non-Master Sync, control is effected so that the Proxy Server is not commissioned with proxy processing. On the other hand, in a case where a NAN device is operated as a Non-Master Non-Sync, the Proxy Server is commissioned to perform proxy processing. That is to say, in a case where there is a need to be in the awake state in all DWs, proxy processing is not commissioned, and the device performs searching or annunciation of services itself. On the other hand, in a case where there is no need to be in the awake state in all DWs, the device commissions proxy processing, and goes into the doze state in a part of the DWs, thereby reducing electric power consumption. Hereinafter, a NAN device that operates as a Master or Non-Master Sync will be referred to as a Beaconing device, and a NAN device operating as a Non-Master Non-Sync will be referred to as a Non-Beaconing device. Also, in the following description, proxy will be referred to as Proxy, and commissioning proxy processing will be referred to as Proxy commissioning.

After describing the configurations of the wireless communication system and communication devices common to the embodiments below, the flows relating to the embodiments will be described.

Configuration of Wireless Communication System

First, a configuration example of a wireless communication system according to the present embodiment will be described with reference to FIG. 1. The wireless communication system according to the present embodiment is configured including the NAN device 101 through NAN device 104 that are each communication devices following the NAN standard, and the NAN devices 101 through 104 are participating in a NAN cluster 105. The NAN devices participating in the NAN cluster 105 (NAN devices 101 through 104) configure a network by frequency channel 6 (6 ch). The NAN cluster 105 is a NAN cluster where the duration of the DW period is 16 TU, and the time interval from the start timing of a DW period to the start period of the next DW period is 512 TU. The DW periods are periods where 16 DW periods of DW0 through DW15 are one cycle, and a DW period 16 DW periods after DWn (where n is an integer of 0 through 15) is also DWn. All NAN devices participating in the NAN cluster 105 are always in the awake state at DW0, and can receive wireless signals.

The NAN device 101 and NAN device 104 are communication devices capable of executing each processing described below. The NAN device 101 can discover communication device around itself and services provided thereby, and can provide information of services that it is capable of providing itself based the NAN standard. The NAN device 101 also can operate as a Proxy Client that commissions another NAN device to perform searching and annunciation of services of other NAN devices by proxy. Assumption will be made that the NAN device 101 participates in the NAN cluster 105 as a Master immediately after startup.

The NAN device 101 further has functions as a printer, and can annunciate print services to other NAN devices. In a case of annunciating services by itself, i.e., in a case of not commissioning Proxy, wireless signals are received at all DW periods. On the other hand, in a case of commissioning Proxy, wireless signals are received only in DW0.

The NAN device 102 is a communication device participating in the NAN cluster 105 as a Non-Master Non-Sync. The NAN device 102 operates as a Proxy Server, and is capable of wireless transmission and reception in all DWs. The NAN device 102 also transmits Publish messages in all DWs to indicate that it has Proxy Server functions.

The NAN device 103 is a communication device participating in the NAN cluster 105 as a Non-Master Non-Sync. The NAN device 103 searches for print services under instructions of the user of the NAN device 103 who is omitted from illustration. That is to say, the NAN device 101 is a Publisher that provides a predetermined service that the NAN device 103 is searching for, and the NAN device 103 is a Subscriber searching for the predetermined service that the NAN device 101 is annunciating.

The NAN device 104 is a NAN device participating in the NAN cluster 105. The NAN device 104 has a higher Master Rank than the NAN device 101.

Configuration of NAN Device 101

Figure 2:
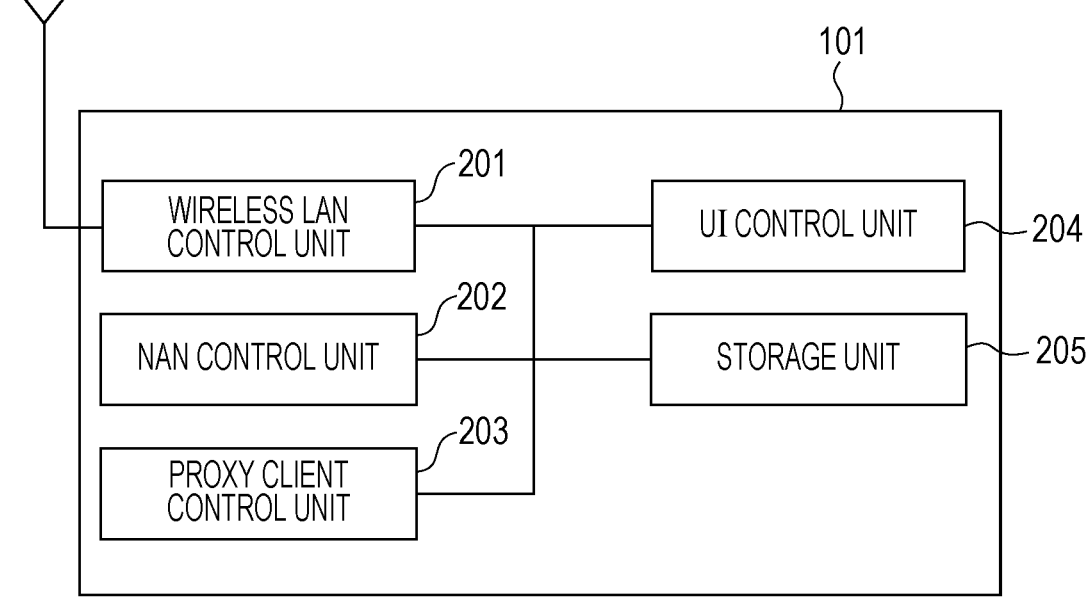
FIG. 2 is a block diagram illustrating a functional configuration example of a NAN device 101.

FIG. 2 is a block diagram illustrating a functional configuration example of the NAN device 101. The NAN device 101 and NAN device 104 have, as the functional configurations thereof, a wireless LAN control unit 201, a NAN control unit 202, a Proxy Client control unit 203, a UI control unit 204, and a storage unit 205.

The wireless LAN control unit 201 is configured including an antenna and circuit for performing transmission/reception of wireless signals with other wireless LAN devices, and programs for control thereof. The wireless LAN control unit 201 executes wireless LAN communication control following the IEEE 802.11 standard series. The NAN control unit 202 is configured including programs and hardware performing control following the NAN standard. The Proxy Client control unit 203 controls the NAN control unit 202 to realize Proxy functions where searching and annunciation of services is commissioned by proxy to another NAN device. The UI control unit 204 is configured including hardware relating to a user interface, such as a touch panel or buttons or the like for accepting operation of the NAN device 101 by a user of the NAN device 101 who is omitted from illustration, and programs for control thereof. Note that the UI control unit 204 also has functions for presenting information to the user, so as displaying images or the like, output of audio, and so forth, for example. The storage unit 205 is a storage device that can be configured of ROM, RAM, and so forth, for saving programs and data for the NAN device 101 to run.

Figure 3:
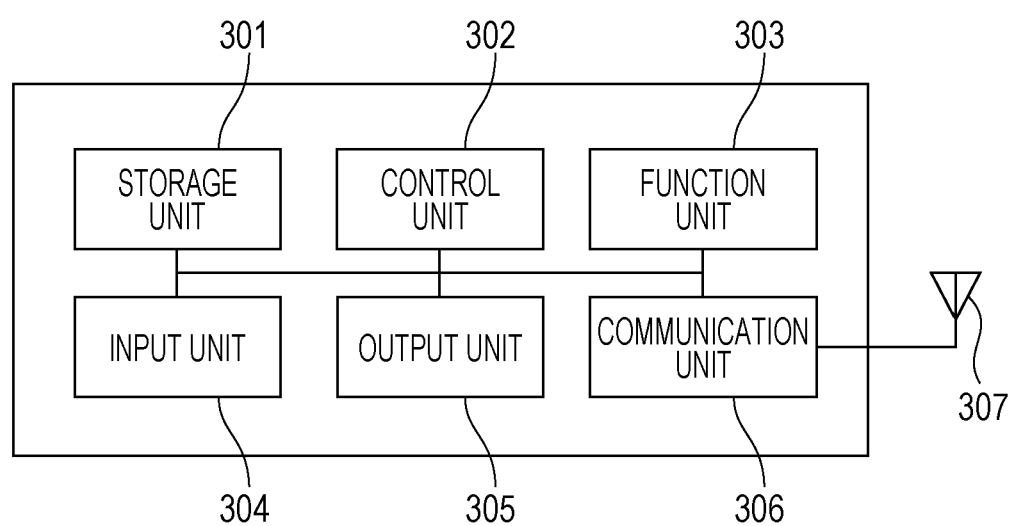
FIG. 3 is a block diagram illustrating a hardware configuration example of the NAN device 101.

FIG. 3 illustrates a hardware configuration of the NAN device 101 and NAN device 104 according to the present embodiment. The NAN device 101 has, as an example of a hardware configuration thereof, a storage unit 301, a control unit 302, a function unit 303, an input unit 304, an output unit 305, a communication unit 306, and an antenna 207.

The storage unit 301 is configured of both or one of ROM and RAM, and stores programs to perform various types of operations which will be described alter, and various types of information such as communication parameters and so forth, for wireless communication. Note that a flexible disk, hard disk, optical disc, magneto-optical disc, compact disc read-only memory (CD-ROM), Compact Disc-Recordable (CD-R), magnetic tape, nonvolatile memory card, digital versatile disc (DVD), or other like storage medium may be used as the storage unit 301, instead of read-only memory (ROM), random access memory (RAM), or the like.

The control unit 302 is configured of one or more CPU or MPU, and controls the entire NAN device 101 by executing programs stored in the storage unit 301. Note that the control unit 302 may control the entire NAN device 101 by collaboration between programs and an operating system (OS) stored in the storage unit 301.

The control unit 302 controls the function unit 303 to execute predetermined processing such as imaging, printing, projecting, and so forth. The function unit 303 is hardware for the NAN device 101 to perform the predetermined processing. For example, in a case where the NAN device 101 is a camera, the function unit 303 is an imaging unit that performs imaging processing. Also, in a case where the NAN device 101 is a printer, the function unit 303 is a printing unit that performs printing processing. Also, in a case where the NAN device 101 is a projector, the function unit 303 is a projecting unit that performs projecting processing. The data that the function unit 303 processes may be data stored in the storage unit 301, or may be data communicated with another communication device via the later-described communication unit 306.

The input unit 304 performs accepting of various types of operations from the user. The output unit 305 performs various types of output to the user. Output by the output unit 305 includes at least one of display on a screen, audio output from a speaker, output of vibrations, or the like. Both the input unit 304 and the output unit 305 may be realized in a single module, such as a touch panel.

The communication unit 306 performs control of wireless communication conforming to the IEEE 802.11 standard series, and control of IP communication. The communication unit 306 controls the antenna 307 to transmit and receive wireless signals for wireless communication. The NAN device 101 communicates image data, document data, video data, and other such like contents, with other communication devices, via the communication unit 306.

Flow of Processing

Next, several embodiments will be described, such as the flow of processing that the NAN device 101 such as described above executes, sequences in the wireless communication system, and so forth.

First Embodiment

In the present embodiment, the NAN device 101 determines whether or not it is to perform Proxy commission to another communication device. Specifically, in a case where the NAN device 101 itself is to operate as a Beaconing device in a NAN cluster, Proxy commissioning is not performed. In a case of operating as a Non-Beaconing device, Proxy commissioning is performed, and electric power consumption is reduced by transmitting and receiving wireless signals only in DW0. In this way, in a case where the NAN device 101 becomes a Beaconing device and is capable of wireless communication in all DWs, proxy response by the Proxy Server is done away with by not performing Proxy commissioning, and use of the wireless band can be reduced accordingly. On the other hand, in a case where the NAN device 101 is a Non-Beaconing device and DWs where wireless communication can be performed can be reduced, performing Proxy commissioning can reduce electric power consumption of the NAN device 101.

Figure 4:
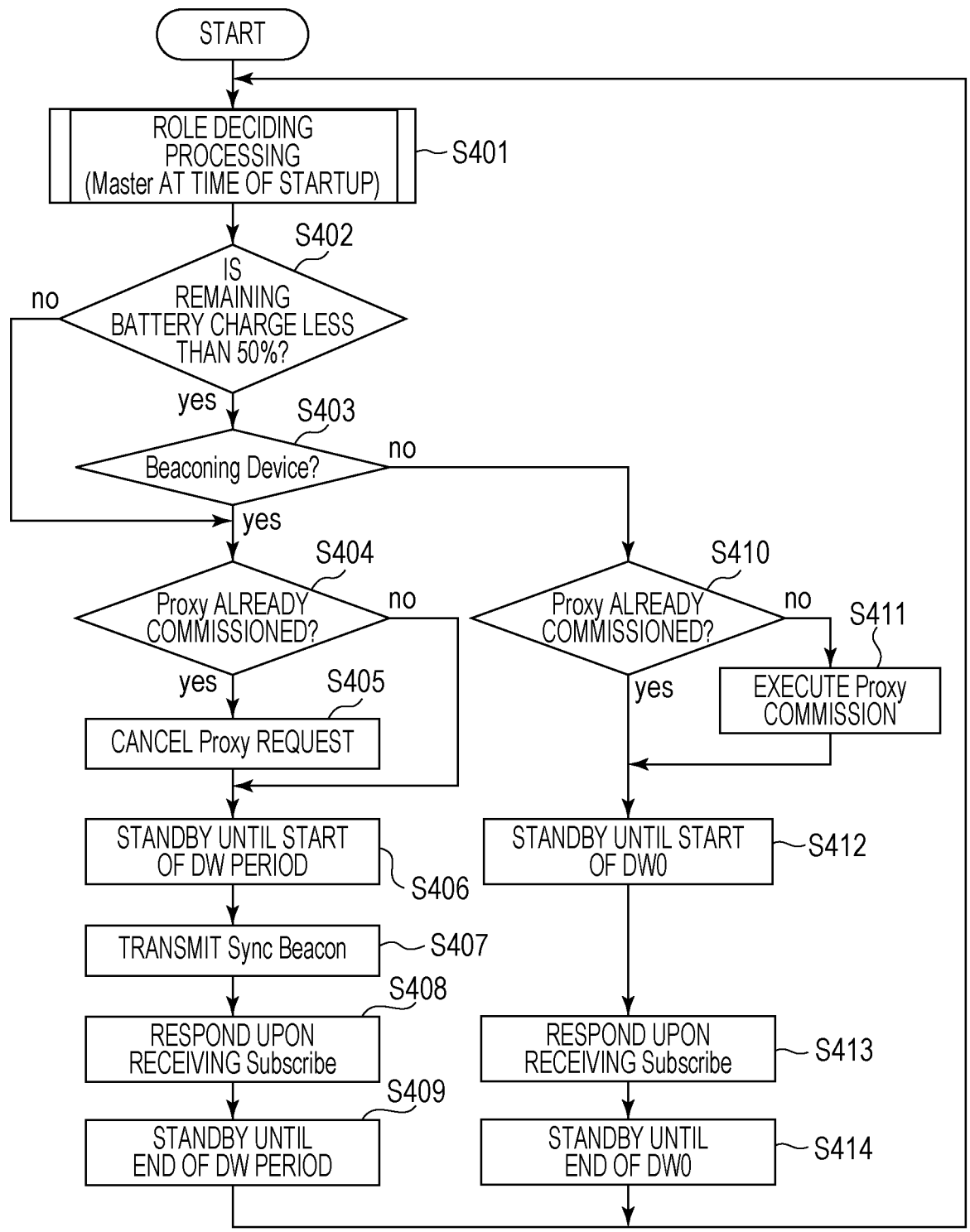
FIG. 4 is a flowchart illustrating operations of the NAN device 101.

FIG. 4 is a flowchart illustrating an example of the flow of processing for deciding whether or not to perform Proxy commissioning at the NAN device 101. This processing is executed when the NAN device 101 participates in the NAN cluster 105. Also, the flowchart illustrated in FIG. 4 illustrates the flow of processing performed by the control unit 302 of the NAN device 101 reading out and executing a computer program stored in the storage unit 301. Note that a configuration may be made where part or all of the steps illustrated in the flowchart illustrated in FIG. 4 are realized by hardware such as an application specific integrated circuit (ASIC) or the like, for example.

Upon starting processing, the NAN device 101 executes role deciding processing in the NAN cluster 105 (S401). This is to decide which of a Master, Non-Master Sync, or Non-Master Non-Sync the NAN device 101 is to be in the NAN cluster 105, based on NAN specifications.

Next, as a result of the role deciding in S401, whether or not to perform Proxy commissioning is judged. Now, if the remaining battery charge of the NAN device 101 is 50% or less, the flow advances to S403 to judge whether to perform Proxy commissioning. On the other hand, if 50% or more, judgment is made that Proxy commissioning will not be performed, and the flow advances to S404. Note that using the remaining battery charge as a reference for judging in S402 is one example, and other judgment references may be used. For example, an arrangement may be made where judgement is made where a particular service is provided or not, and in a case where provided, the flow advances to S403, while in a case where not provided, the flow advances to S404. Alternatively, an arrangement may be made where the flow advances to S404 in a case where an instruction has been made by user operations to not perform Proxy commissioning, and the flow advances to S403 in a case where an instruction has been made to perform Proxy commissioning.

Next, the NAN device 101 determines whether it is a Beaconing device itself (S403). A Beaconing device is a device that transmits Sync Beacons in DWs, which is to say, a Master or a Non-Master Sync.

In a case where determination has been made in S403 to be a Beaconing device, the flow advances to S404 through 409, since Proxy commissioning will not be performed thereafter. On the other hand, in a case of having determined not to be a Beaconing device in S403, the processing advances from S410 through S414 since Proxy commissioning is to be performed. First, a case where it is a Beaconing device will be described.

The NAN device 101 judges whether Proxy commissioning to a Proxy Server has already been performed (S404). If already commissioned at this time, the NAN device 101 transmits a Proxy cancellation commission to the Proxy Server, and cancels the Proxy commission that has already been commissioned (S405).

Next, the NAN device 101 stands by until the start of a DW (S406). When the DW arrives, the NAN device 101 transmits a Sync Beacon (S407), since it is a Beaconing device. In a case of having received a Subscribe message for searching for a print service, a Publish message is transmitted indicating that a print service is provided (S408). The NAN device 101 returns to role deciding processing when the DW period ends (S409).

Next, a case where the NAN device 101 is not a Beaconing device will be described. The NAN device 101 judges whether Proxy commissioning to a Proxy Server has already been performed (S404). If not commissioned at this time, the NAN device 101 transmits a Proxy registration request to the Proxy Server, and performs Proxy commissioning to the Proxy Server (S411). At this time, in case where no Proxy Server can be found, or in a case where the Proxy commission has been denied by the Proxy Server, S406 through S409 is repeated until a Proxy Server capable of executing proxy processing is discovered. That is to say, the awake state is maintained in all DW periods, so that in a case where a print service search arrives, this can be discovered immediately. Note that control may be effected where the awake state is realized only in DW0 rather than the awake state being realized in all DWs. In this case, ease of discovering a service is sacrificed and more time is required to discover a service, but electric power consumption of the NAN device 101 can be reduced.

When in a Proxy-commissioned state, the NAN device 101 goes from a state of being awake in all DWs to a state of being awake in only DW0. That is to say, the NAN device 101 first stands by in the doze state to DW0 (S412). The processing of S413 is executed in DW0 in the same way as in S408. Upon DW0 ending, the NAN device 101 returns to S401 (S414).

Figure 5A:
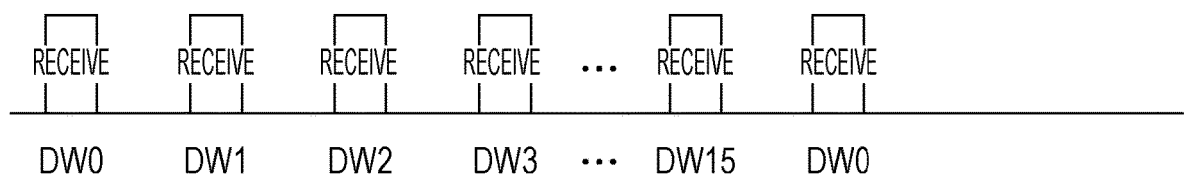
FIG. 5A is a diagram illustrating an example of the relation between DW period and signal transmission/reception timing.
Figure 5B:
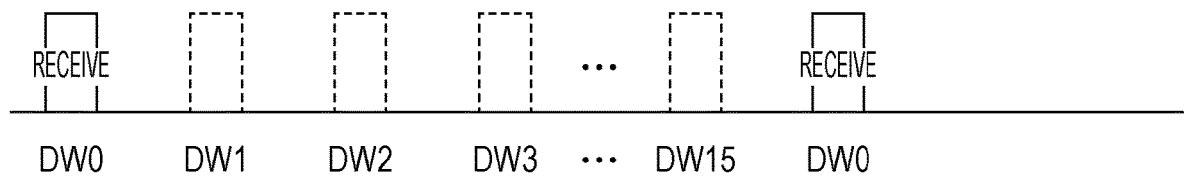
FIG. 5B is a diagram illustrating an example of the relation between DW period and signal transmission/reception timing.

FIGS. 5A and 5B are diagrams schematically represent the reception state of wireless signals by the NAN device 101 at each of S406 through S409 and S412 through S414. FIG. 5A corresponds to the case of S406 through S409, and illustrates a state of receiving wireless signals in all DW periods. In this case, the NAN device 101 enables the reception circuit of the wireless LAN control unit 201 in all DW slots, i.e., DW0 through DW15, and receives wireless signals. Accordingly, the NAN device 101 can improve the probability of receiving wireless signals from other NAN devices, and in a case where wireless signals are received, the wireless signals can be speedily responded to.

On the other hand, FIG. 5B corresponds to the case of S412 through S414, indicating a state of receiving wireless signals only in DW0. In this case, the NAN device 101 does not perform reception of wireless signals in DW1, DW2, DW3, and so forth, so the electric power consumption can be reduced according to the reduction of frequency of receiving wireless signals in DW periods. Note though, that the NAN device 101 cannot receive wireless signals transmitted from other NAN devices in DW1, DW2, DW3, and so forth, and cannot speedily response to such wireless signals. However, Proxy commissioning has already been performed, so the Proxy Server will respond in proxy in DW1, DW2, DW3, and so forth.

Figure 6:
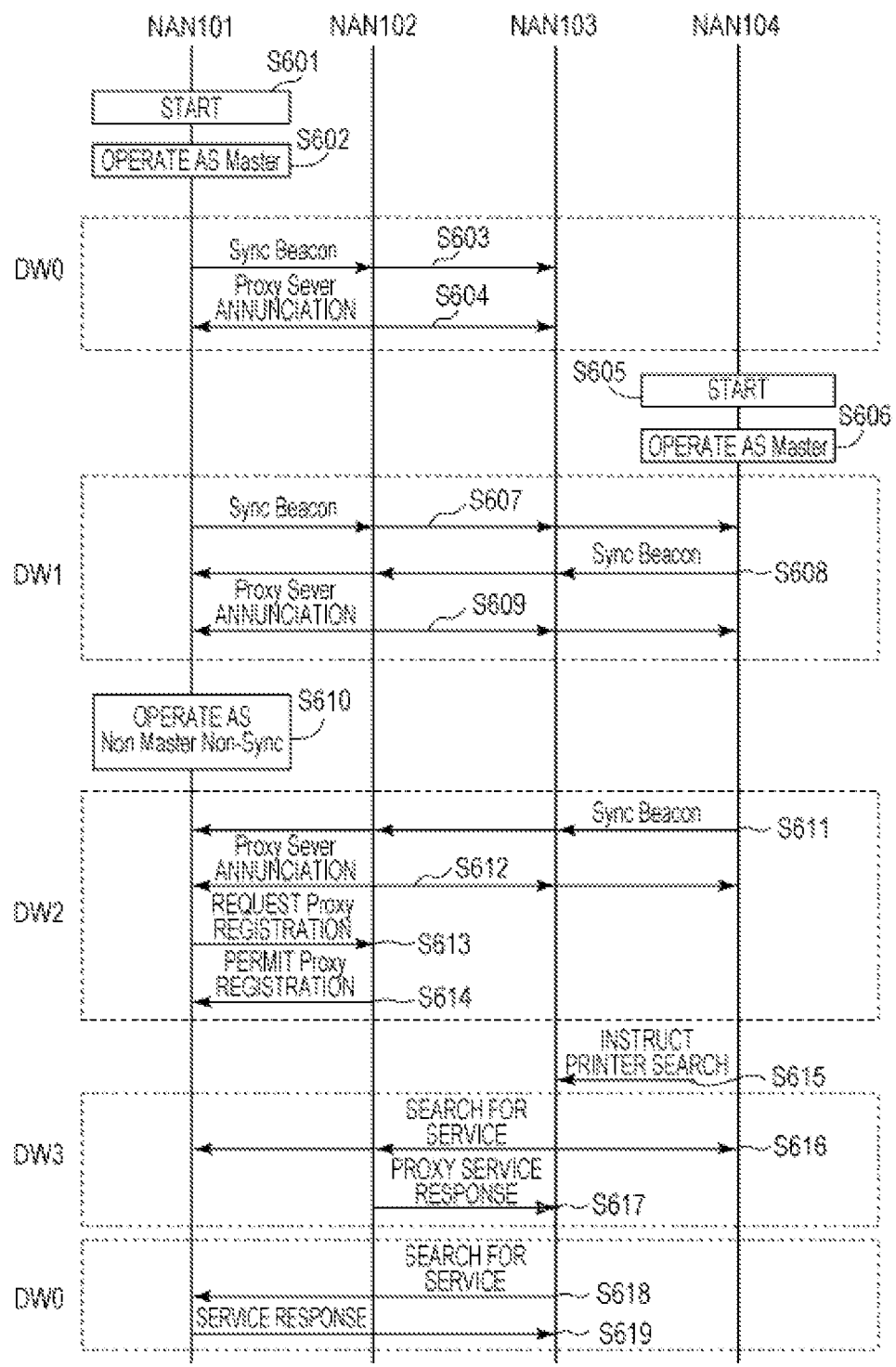
FIG. 6 is a sequence diagram illustrating a first example of the flow of Proxy commissioning processing.

Next, a sequence in a case of the NAN device 101 participating in the NAN cluster 105 and performing Proxy commissioning will be described with reference to FIG. 6. Also, assumption is made that the NAN device 102 and NAN device 103 are participating in the NAN cluster 105, and that the NAN device 104 is not participating. Also, assumption is made that a NAN device omitted from illustration in FIG. 1 is the Master of the NAN cluster 105.

First, the user of the NAN device 101 starts up the NAN device 101 (S601). Upon the NAN device 101 starting up, the NAN cluster 105 is discovered, role deciding processing is performed based on S401, and decision is made to operate as the Master of the NAN cluster 105 (S602). This is an operation based on NAN specifications, to operate as a Master at first, immediately after joining a NAN cluster. At this time, the NAN device 101 operates as a normal NAN device in a case where the remaining battery charge is 50% or more based on S402, and does not perform Proxy commissioning (S406 through S409). Hereinafter, description will be made assuming that the remaining battery charge was less than 50%.

The NAN device 101 is operating as a Beaconing device based on S403, and accordingly does not perform Proxy commissioning. Also, Proxy commissioning has not been performed at the state immediately after having started up, so there is no cancelling of the Proxy commission either.

When DW0 arrives, the NAN device 101 transmits a Sync Beacon to annunciate being a DW, since the NAN device 101 is a Beaconing device (S603). The NAN device 102 transmits a Publish message in the DW period to annunciate that it has Proxy Server functions (S604). Accordingly, the NAN devices participating in the NAN cluster 105 can recognize that the NAN device 102 is a Proxy Server.

Upon the DW0 period being completed, the NAN device 101 performs role deciding processing. Description will be made assuming that at this point in time, no NAN device with a higher Master Preference than the NAN device 101 does not exist, and the NAN device 101 is a Master.

Next, the user of the NAN device 104 starts up the NAN device 104 (S605). Upon the NAN device 104 starting up, the NAN device 104 discovers the NAN cluster 105, and decides to operate as the Master of the NAN cluster 105 (S606). This is an operation based on NAN specifications, to operate as a Master first, immediately after joining a NAN cluster.

When DW1 arrives, the NAN device 101 and NAN device 104 each transmit a Sync Beacon (S607, S608), since they are both Beaconing devices. At this time, the Sync Beacon has been provided with information of Master Preference that indicates the likelihood of becoming a Master. When a DW period arrives, the NAN device 102 executes the processing of S609 in the same way as S604.

When the DW1 period is completed, the NAN device 101 performs role deciding processing. At this time, the NAN device 104 has a higher Master Preference, so in the processing of S401 the NAN device 101 decides to operate as a Non-Master Non-Sync (S610). Upon deciding to operate as a Non-Master Non-Sync, i.e., a Non-Beaconing device, processing is executed to perform Proxy commissioning based on FIG. 4.

When DW2 arrives, the NAN device 104 transmits a Sync Beacon (S611). The NAN device 102 also annunciates that it is a Proxy Server (S612). In the following description, description of Sync Beacon transmission and Proxy Server annunciation will be omitted unless particularly necessary.

Upon receiving the Proxy Server annunciation in S612 and discovering the Proxy Server, the NAN device 101 transmits a Proxy registration request to the NAN device 102, to have services annunciated in proxy (S613). At this time, after having performed a Proxy commission, the NAN device 101 notifies the NAN device 102 of a DW in which the NAN device 101 itself is awake. After Proxy commissioning is completed, the NAN device 101 is awake only in DW0. That is to say, awake and doze are repeated as illustrated in FIG. 5B. Further, the NAN device 101 makes notification to the NAN device 102 to the effect that print services can be provided.

Upon receiving the Proxy registration request in S613, the NAN device 102 transmits a message notifying that Proxy registration will be completed (S614). Thereafter, when a Subscribe message searching for a print service is received, the NAN device 102 returns a message notifying that the NAN device 101 is providing print services, as a response. Further, by responding also with information that the NAN device 101 is awake in DW0, the NAN device 102 performs service annunciation instead of the NAN device 101. Hereinafter, a message notifying that the NAN device 101 is providing print services and is awake in DW0 will be referred to as a "proxy service annunciation". This is transmitted as a Publish message.

When DW2 is completed, the NAN device 101 performs role deciding processing, but the NAN device 104 is present, so the NAN device 101 remains a Non-Master Non-Sync.

Now, assumption will be made that the user of the NAN device 103 has instructed the NAN device 103 to search for a printer (S615). The NAN device 103 then transmits a Subscribe message searching for a print service, to search for a service (S616). Upon receiving the Subscribe message searching for a print service, the NAN device 102 transmits a Publish message notifying by proxy that the NAN device 101 is providing print services (S617). Thus, the NAN device 103 that has received this can know that the NAN device 101 is providing print services and that the NAN device 101 is awake in DW0. Description of processing in DW4 through 15 will be omitted.

When DW0 arrives, the NAN device 103 is in a communicable state with the NAN device 101, and accordingly transmits a Publish message that is a service search message, addressed to the NAN device 101 (S618). The NAN device 101 then transmits a Publish message to notify that print services are being provided, as a response thereto (S619). Wireless LAN setting information to use the print services is also transmitted at this time, included in the Publish message. Specifically, this is a communication parameter for connecting by Wi-Fi Direct in order to directly communicate with the NAN device 102 and use print services. Communication parameters include information such as an SSID serving as a network identifier, encryption key, encryption format, or the like. The NAN device 103 performs a Wi-Fi Direction connection with the NAN device 102 based on this information, and actually uses the print services, although omitted from illustration.

According to the above processing, the NAN device 101 can commission the NAN device 102 to annunciate services in proxy. Accordingly, the NAN device 101 goes into a doze state during the periods of DW1 through 15 to reduce electric power consumption, while the NAN device 103 can be notified that the NAN device 101 has print services.

Figure 7:
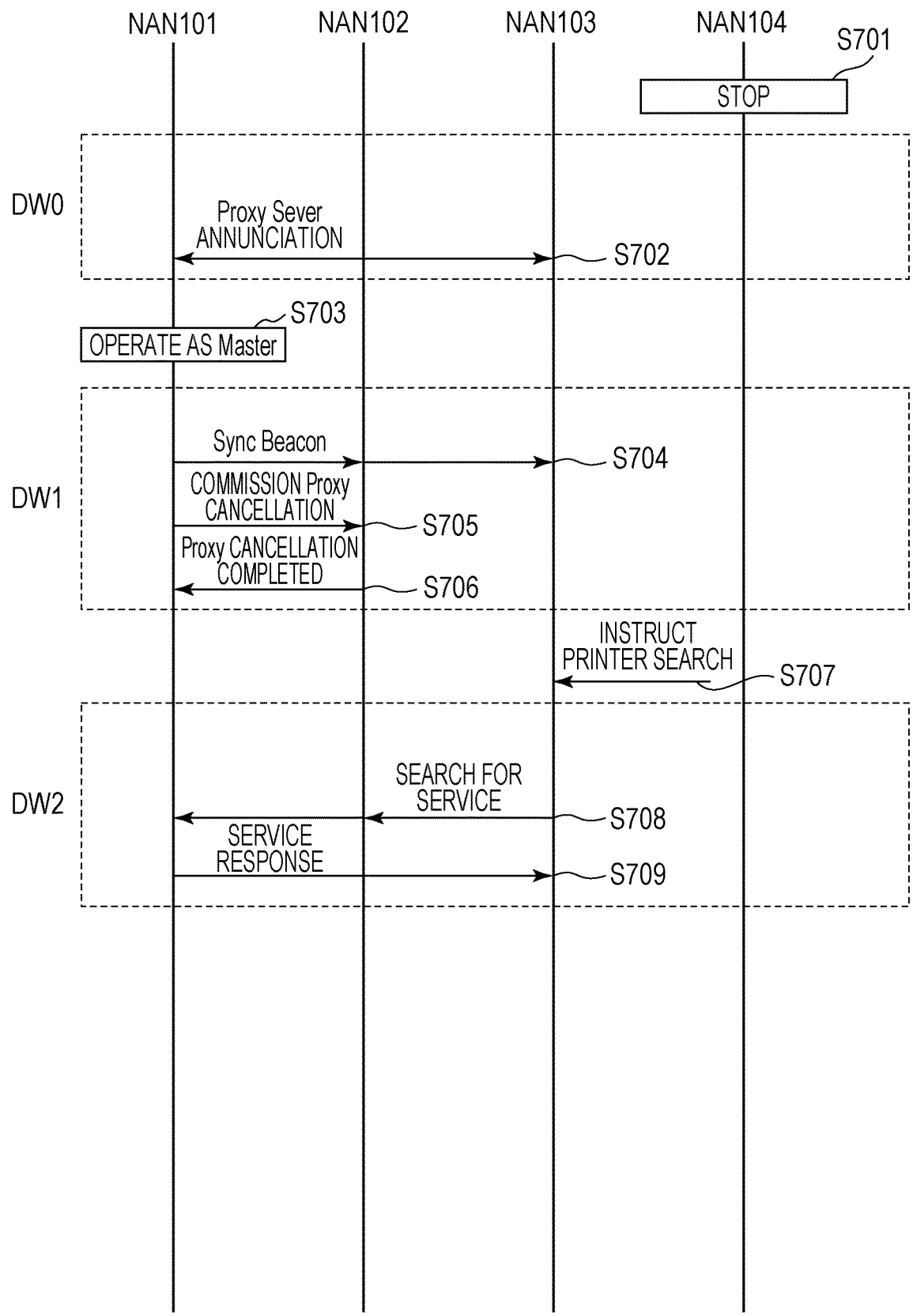
FIG. 7 is a sequence diagram illustrating a first example of the flow of Proxy commissioning processing in a case where a NAN device 104 has withdrawn.

Next, a sequence in a case of the NAN device 101 cancelling the Proxy commission after the NAN device 104 has withdrawn from the NAN cluster 105 will be described with reference to FIG. 7. FIG. 7 is processing following FIG. 6, and description will start assuming a state where the Proxy commissioning of the NAN device 101 to the NAN device 102 has already been completed, and the NAN device 102 annunciates services of the NAN device 101 in proxy.

First, the NAN device 104 is stopped by the user, and withdraws from the NAN cluster 105 (S701). In the subsequent DW0, the NAN device 101 cannot receive a Sync Beacon from the NAN device 104, and accordingly decides to operate as a Master as the result of role deciding processing after DW0 ends. Thus, the NAN device 101 is in the awake state in all DWs, as illustrated in FIG. 5A. Accordingly, the NAN device 101 is now capable of responding to a Subscribe by itself, without Proxy commissioning to the NAN device 102. Accordingly, control is effected to cancel the Proxy commission based on S405 in FIG. 4, so as to be able to respond to a Subscribe in every DW0 by itself.

In DW1, the NAN device 101 transmits a Sync Beacon since it is the Master (S704). The NAN device 101 then transmits a Proxy cancellation commission to the NAN device 102 that is the Proxy Server, to cancel the Proxy commission (S705). Then upon receiving the Proxy cancellation commission in S705, the NAN device 102 notifies that Proxy cancellation has been completed (S706).

Assumption will be made here that the user of the NAN device 103 has instructed the NAN device 103 to search for a printer, in the same way as in S612 (S707). The NAN device 103 then transmits a Subscribe message searching for a print service, to search for a service (S708). The NAN device 101 is in the awake state in all DWs, so unlike in S616, is capable of responding with a Publish message indicating that it is providing print services itself (S709).

According to the processing described above, in a case where the NAN device 101 is a Beaconing device, i.e., in a case of being in the awake state in all DWs, a Proxy Server is not commissioned with proxy processing. Thus, the NAN device 102 ceases to transmit the proxy service response in S708, so the wireless band being used can be reduced. On the other hand, in a case where the NAN device 101 becomes a Non-Beaconing device and there is no more need to be awake in all DWs, the electric power consumption of the NAN device 101 can be reduced by Proxy commissioning. Moreover, another NAN device searching for a service provided by the NAN device 101 can receive a response from the Proxy Server. Accordingly, services are easy to be discovered, and services can be discovered speedily.

Second Embodiment

In the present embodiment, the NAN device 101 has established a data link by NAN to match the cycle of DWs of the NAN, and does not perform Proxy commissioning in a case of being in the awake state in all DWs. On the other hand, in a case where the NAN device 101 does not perform data communication to match the cycle of DWs of the NAN, and performs Proxy commissioning in a case of not being in the awake state in all DWs, thereby reducing electric power consumption.

Figure 8:
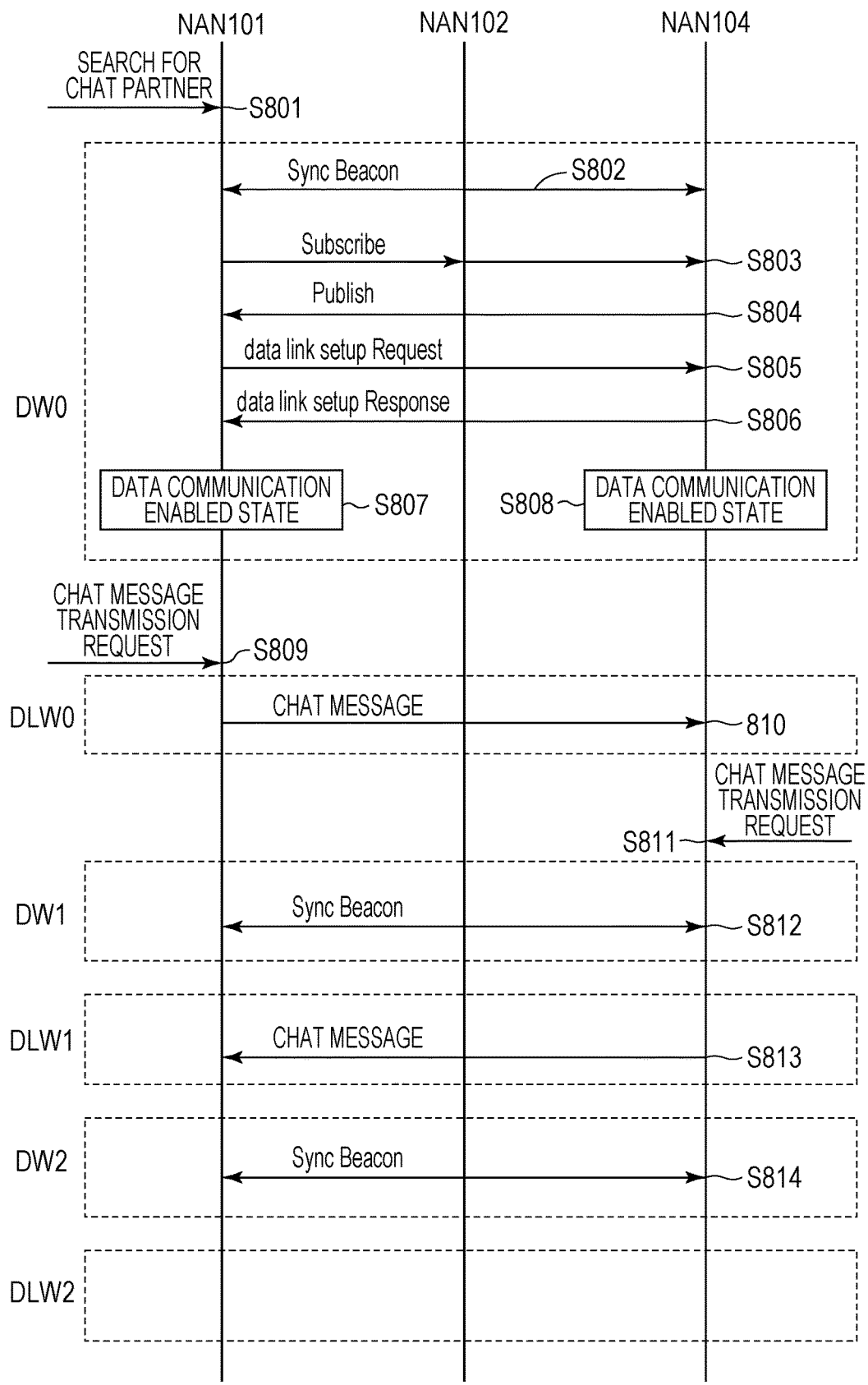
FIG. 8 is a sequence diagram illustrating a second example of establishing a data link by NAN.

First, a flow where the NAN device 101 according to the present embodiment establishes a data link by NAN and performs application communication processing by the NAN data link will be described with reference to the sequence diagram in FIG. 8. A situation is assumed where NAN device 101 is searching for a partner device with which to perform chat communication by a chat application (hereinafter, referred to as chat partner), and the NAN device 104 is in a state of executing processing to standby for a chat partner in the chat application. The NAN device 102 has an application other than the chat application running, and operates as the Master of the NAN cluster 105.

First, the user of the NAN device 101 causes the chat application to start processing to search for a chat partner, via the input unit 304 (S801). The NAN device 102 notifies the DW period by a Sync Beacon (S802). Even though the NAN device 101 has started searching processing, a message is not transmitted until a DW period arrives.

When a DW period arrives, the NAN device 101 transmits a Subscribe message to search for a chart partner, by broadcast (S803). At this time, information indicating that data link communication by NAN is supported is included in the Subscribe message. Upon receiving the Subscribe message searching for a chart partner, the NAN device 104 responds to the NAN device 101 by a Publish message indicating that the chat application is operating (S804). Information indicating that data link communication by NAN is supported included in this Publish message as well.

The NAN device 101 receives the Publish message, and in a case where the transmitting party can be judged to be able to handle communication by NAN data link, transmits a data link setup request during a DW period (S805). A data link setup request is a message to request establishing a data link by NAN. Further, a data link setup request includes information indicating at which timing outside of a DW period to perform data link communication by NAN, with the DW periods as a reference. This information is expressed as a Bitmap, and hereinafter will be referred to as Data Link Bitmap. Each bit in the Data Link Bitmap specifies how far away from a DW period is the period in which communication by NAN data link is to be performed. Specifically, in a case where start of a DW period is 0 TU and immediately after ending the DW is 16 TU, a Data Link Bitmap of which the N'th bit is 1 indicates that there is a possibility that communication by data link will occur in a period of (N+1)×16 TU to (N+2)×16 TU. For example, a Data Link Bitmap where the 0 bit is 1 indicates that there is a possibility that communication by data link will occur in a period of 16 TU to 32 TU, and a Data Link Bitmap where the 2nd bit is 1 indicates that there is a possibility that communication by data link will occur in a period of 48 TU to 64 TU. 1 may be specified for multiple bits in a Data Link Bitmap. In this way, a period can be specified where communication by data link can be performed in increments of the same duration as DW periods, in periods outside of DWs. Note that the method for specifying periods to perform communication by data link is not restricted to the above method, as long as a period outside of DW periods is specified. The period for data link communication by NAN outside of DW periods that is specified here is called a data link window (hereinafter, DLW).

At this time, in a case where a DW period has ended, the NAN device 101 can transmit a data link setup request in the next DW period.

Upon receiving the data link setup request, the NAN device 104 responds with a data link setup response (S806). At this time, the same DLW period as the data link setup request is specified, in the same way as with the data link setup request. Upon this exchange being completed, a NAN data link is established between the NAN device 101 and the NAN device 104, and the NAN device 101 and NAN device 104 are in a state where communication by chat application can be performed (S807, S808). Thereafter, transmission and reception of wireless packets is performed not only in DW periods but also in DLW periods specified in the data link setup response. That is to say, the NAN device 101 and NAN device 104 are capable of performing communication by data link in a state where communication in DW periods can be maintained.

The state is now such that chat can be performed, and the user of the NAN device 101 requests transmission of a chat message (S809). The NAN device 101 then transmits this chat message to the NAN device 104 once the DWL period arrives (S810). Upon receiving the chat message, the NAN device 104 notifies the user of the NAN device 104 about the chat message. Assumption will be made that the user of the NAN device 104 who has seen this requests transmission of a chat message (S811). The NAN device 104 then transmits a chat message after the DLW period arrives (S813). A situation is illustrated here where a DW period occurs in the time between the transmission request of the chat message and the time of actually transmitting the chat message, and the NAN device 102 has transmitted a Sync Beacon (S812, S814).

Figure 9A:
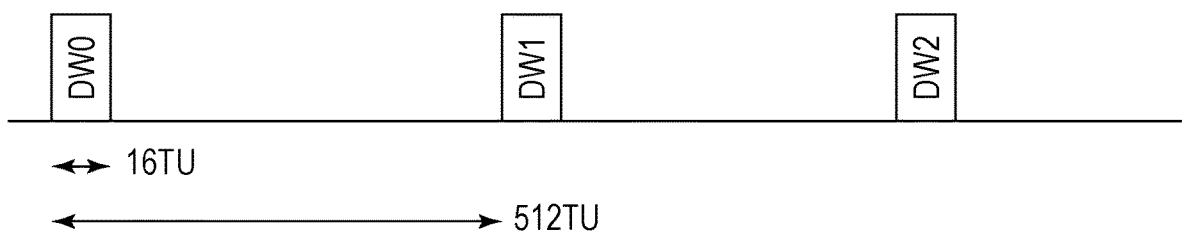
FIG. 9A is a diagram illustrating an example of signal transmission/reception timing in a case of having established a data link by NAN.
Figure 9B:
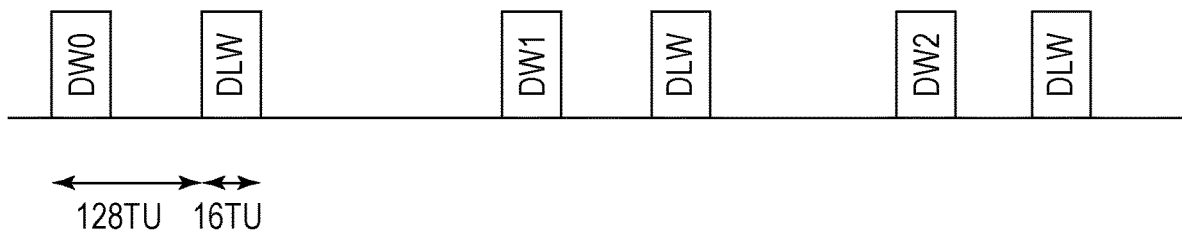
FIG. 9B is a diagram illustrating an example of signal transmission/reception timing in a case of having established a data link by NAN.

FIGS. 9A and 9B illustrate a schematic diagram illustrating the relation between DW periods and DLW periods. FIG. 9A illustrates a case where a NAN data link has not been established, and packets are transmitted/received only during DW periods. FIG. 9B illustrates that a NAN data link has been established, and packets are being transmitted and received in both DW periods and DLW periods.

FIG. 9A illustrates a case where a DW period arrives every 512 TU and the DW period is 16 TU, and where packet transmission and reception is performed only during DW periods. The DW periods are periods where multiple NAN devices participating in the NAN cluster are awake, and discovery and detection of services, and transmission and reception of frames to establish a data link, are performed by the NAN devices in these DW periods. Transmission and reception of wireless frames is not performed outside of the DW periods, so electric power consumption can be reduced.

FIG. 9B indicates a case where a data link has been established, with the DLW period being 128 TU after the start of a DW, and each DLW period is 16 TU. That is to say, 0b00000100 is specified for each Data Link Bitmap of the data link setup response. The NAN devices operate in the same way as described in FIG. 9A during DW periods. Also, unlike FIG. 9A, the NAN devices transmit and receive application data during DWL periods. Transmission and reception of wireless frames is not performed at periods other than these, so electric power consumption is reduced.

Upon data link communication by NAN being established, the NAN devices regarding which this has been established are in the awake state in each DW, for communication in DLW periods. A Sync Beacon is received and taken as a standard, whereby transmission and reception is performed at correct timing during the DLW periods.

Figure 10:
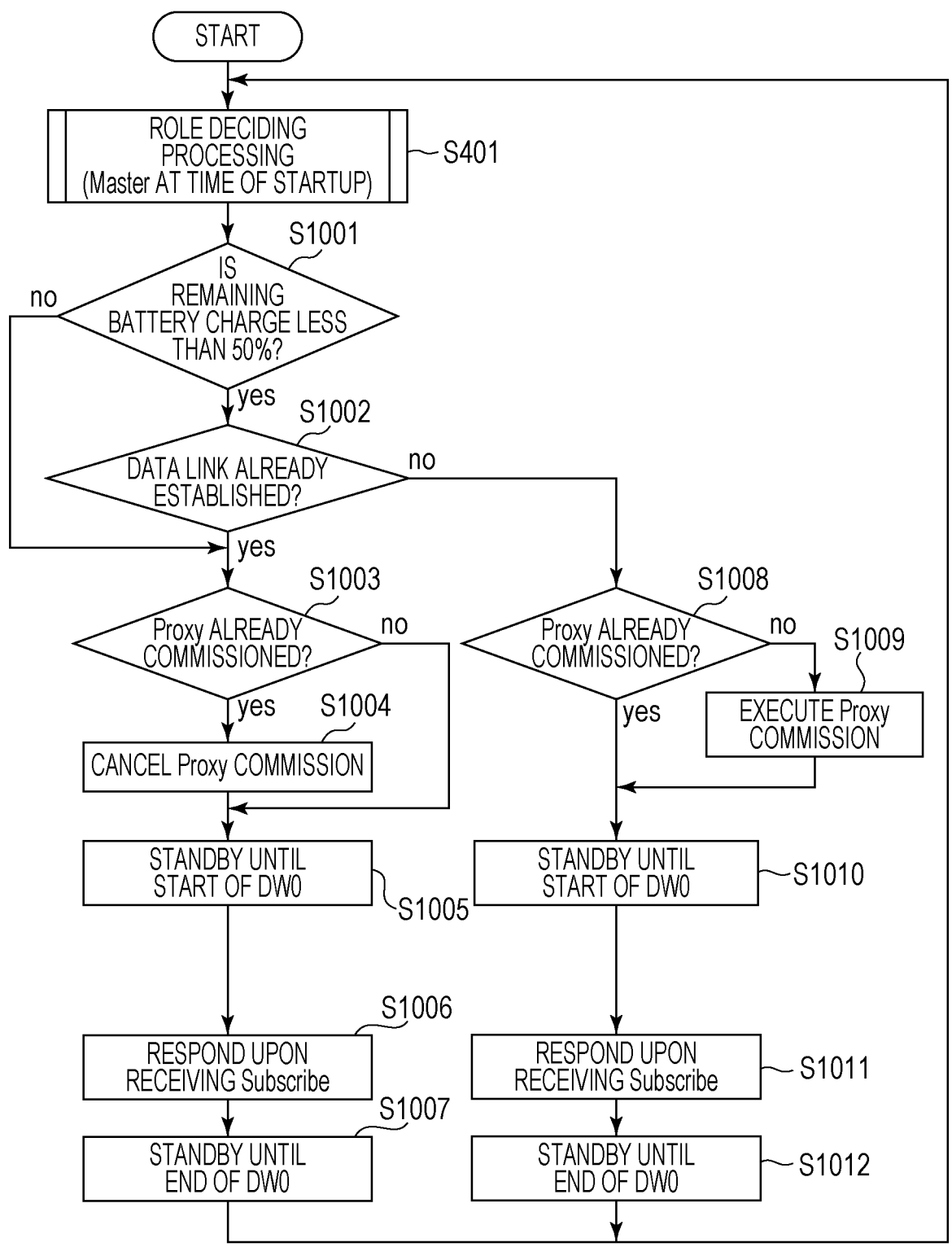
FIG. 10 is a flowchart illustrating operations of the NAN device 101.

FIG. 10 is a flowchart illustrating processing that is executed at the NAN device 101 according to the present embodiment. Description of points that are the same as in FIG. 4 will be omitted. This processing is executed at a certain time frequency, every ten seconds for example. The flowchart illustrated in FIG. 10 illustrates a flow of processing executed by the control unit 302 of the NAN device 101 reading out and executing a computer program stored in the storage unit 301. Note that a configuration may be made where part or all of the steps illustrated in the flowchart illustrated in FIG. 10 are realized by hardware such as an ASIC or the like, for example.

The present embodiment differs from the first embodiment where whether or not to perform Proxy commissioning is switched in accordance with the judgment results of S403, with regard to the point that whether or not to perform Proxy commissioning is switched in accordance with the judgment results of S1002. That is to say, in the present embodiment, the NAN device 101 judges whether a data link has been established, and if a data link has been established Proxy commissioning is performed, while if in a state where data link has not been established, Proxy commissioning is not performed. Processing of performing Proxy commissioning, processing of service response in proxy, and so forth, are the same as in FIGS. 6 and 7 in the first embodiment, so description thereof will be omitted.

The NAN device 101 performs role deciding processing in S401, in the same way as in FIG. 4. As a result, the NAN device 101 operates as one of a Master, Non-Master Sync, or Non-Master Non-Sync. After the role deciding processing, the NAN device 101 judges whether the remaining battery charge is 50% or less (S1001), and in a case of 50% or less advances to S1002. In S1002, the NAN device 101 judges whether or not a data link has already been established. In a case of judging that a data link has already been established, the flow advances to S1003, and Proxy commissioning is not performed. On the other hand, in a case of judging that a data link has not been established yet, the flow advances to S1008, and Proxy commissioning is performed. The processing of S1003 and thereafter, and the processing of S1008 and thereafter is the same as the processing of S404 and thereafter and S410 and thereafter, respectively, in FIG. 4. Note however, that the flow in FIG. 10 illustrates an example of a case of becoming a Non-Master Non-Sync, i.e., a Non-Beaconing device, in the role deciding processing. Accordingly, this differs with regard to the point that standby is performed until the DW0 period start in S1005 and S1010, instead of standing by until a DW period starts. This also differs with regard to the point that a Sync Beacon is not transmitted. In a case of becoming a Master or Non-Master Sync, i.e., a Beaconing device, in the role deciding processing in S401, standby will be performed until a DW period in S1005 and S1010 in FIG. 10. Also, in this case, a Sync Beacon will be transmitted in the DW period.

In the present embodiment, Proxy commissioning is not performed in a case where the NAN device performs wireless communication at the same cycle as DW outside of DW periods. That is to say, in a case where the NAN device is in an awake state in all DW periods with the purpose of synchronization to perform wireless communication outside of DW periods, service annunciation and searching can be performed, so Proxy commissioning is not performed. This can prevent the Proxy Server from unnecessarily responding even though the Proxy Client is capable of service annunciation and searching, and usage of the wireless band can be reduced.

Although an example of data link communication by NAN has been described in the present embodiment, this is not restricted to data link communication by NAN, as long as in the awake state in all DW periods with the purpose of performing communication at the same cycle as DW periods outside of the DW periods. For example, the present invention may be applied to a case of performing distance measurement among NAN devices by Fine Timing Measurement (hereinafter, FTM) based on IEEE 802.11-MC, at a predetermined timing outside of DW periods. Also, the present invention may be applied to a case of performing application communication by PostNAN.

Third Embodiment

In the present embodiment, whether or not to perform Proxy commissioning is decided upon having compared a DW count where a NAN device that is preparing to commission Proxy is in the awake state, and a DW count where a NAN device that has Proxy Server functions is in the awake state. That is to say, in a case where the DW count where the Proxy Client is in the awake state is greater, Proxy commissioning is not performed. On the other hand, in a case where the DW count where the Proxy Client is in the awake state is smaller, Proxy commissioning is performed. One primary point of difference from the first embodiment will be described below.

Figure 11:
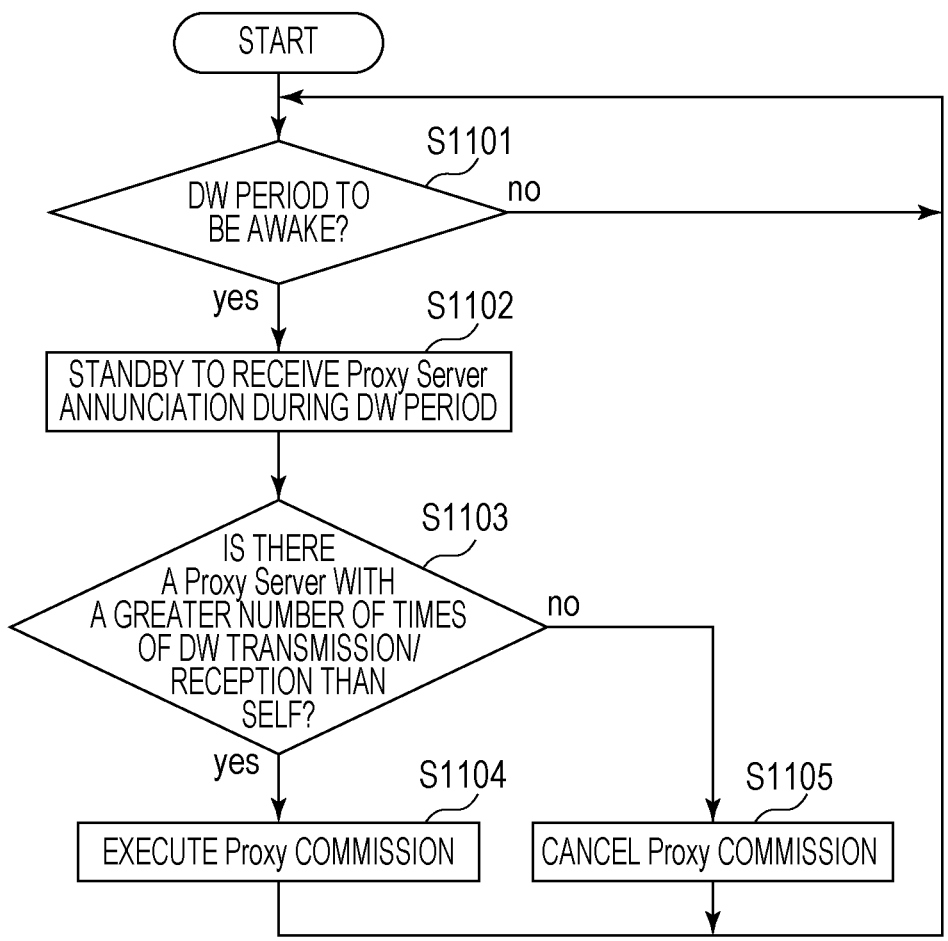
FIG. 11 is a flowchart illustrating operations of the NAN device 101.

FIG. 11 is a flowchart illustrating processing executed at the NAN device 101 according to the present embodiment. Description of points that are the same as in FIG. 4 will be omitted. This processing is executed at a certain time frequency, every ten seconds for example. The flowchart illustrated in FIG. 11 illustrates a flow of processing executed by the control unit 302 of the NAN device 101 reading out and executing a computer program stored in the storage unit 301. Note that a configuration may be made where part or all of the steps illustrated in the flowchart illustrated in FIG. 11 are realized by hardware such as an ASIC or the like, for example.

First, the NAN device 101 makes judgement regarding whether this is a DW period to be in an awake state. (S1101). Whether a DW period to be in an awake state is decided by the remaining battery charge of the NAN device.

Figures 12, 13:
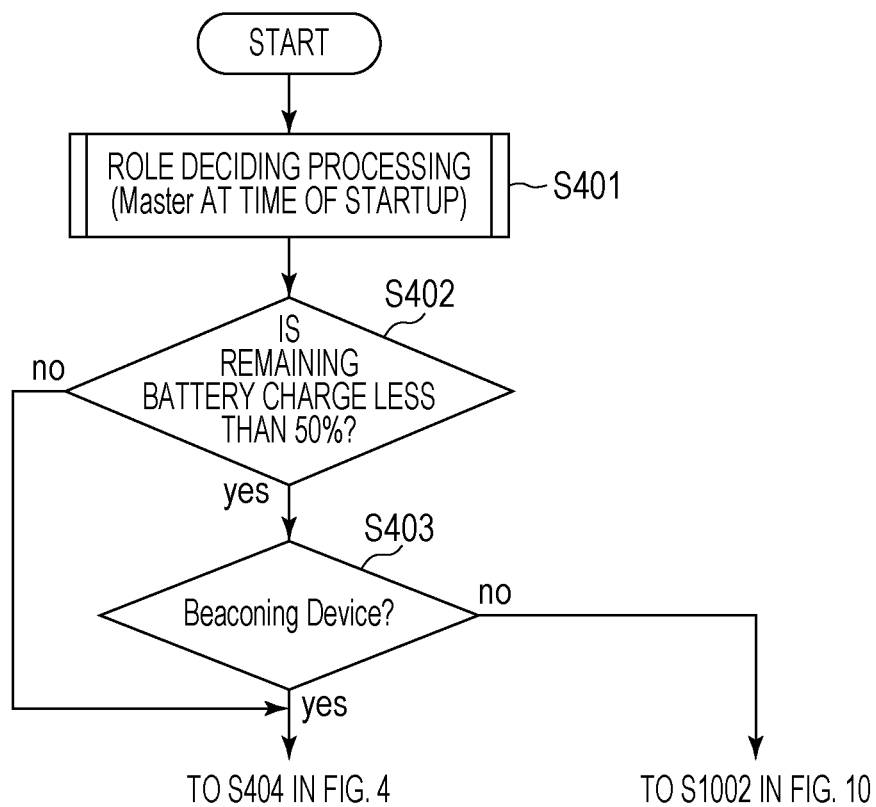
FIG. 12 is a diagram illustrating an example of the relation between remaining battery charge and reception DW frequency.
FIG. 13 is a flowchart illustrating operations of the NAN device 101.

FIG. 12 illustrates a correlation between the remaining battery charge and DWn (where n is 0 to 15) timings to be in an awake state.

When a DW to be in an awake state arrives, the NAN device 101 continues to await reception of a Proxy Server annunciation during this DW period (S1102). This is to receive a message, such as in S604 in FIG. 6. In the present embodiment, the NAN device 102 that is the Proxy Server includes information of DWn that it will be in an awake state itself if commissioned with a Proxy. That is to say, if DW0 through 15 are specified in the Proxy Server annunciation, the Proxy Server is in the awake state in all DWs. Accordingly, in a case of having received a service search matching a service regarding which Proxy has been commissioned as in S616, the Proxy Server performs a proxy service response as in S617.

Upon waiting for reception of a Proxy Server annunciation, the NAN device 101 judges whether or not there is a Proxy Server in the received Proxy Server annunciation where the DW count of awake state is greater than the NAN device 101 (S1103). If there is one, the NAN device 101 performs a Proxy commissioning to this Proxy Server (S1104). Note that if Proxy commissioning has already been performed, this processing is not performed, the same as in FIG. 4. Proxy commissioning is performed in DW periods as in S613 to S614 in FIG. 6. Transmission may be performed in the next DW period from the DW period where reception of the Proxy Server annunciation was awaited, or if the next DW period is in a doze state, a DW period where in the awake state may be awaited for transmission.

On the other hand, in a case where judgment is made in S1103 that there is no Proxy Server where the DW count of awake state is greater than the NAN device 101, the NAN device 101 cancels the Proxy commission. (S1105). The NAN device 101 also cancels the Proxy commission (S1105) in a case where a Proxy Server annunciation was not received in S1102, as well. If no Proxy commissioning has been made so far, that state is maintained (S1105). Cancelling of Proxy commissioning is processed as in S705 to S706 in FIG. 7.

As described above, in the present embodiment, the NAN device performs Proxy commissioning to a Proxy Server where the DW count of awake state is greater than itself. Accordingly, the Proxy Server responds in proxy at timings of a doze state for the NAN device itself, so use of wireless band can be reduced. If a Proxy Server where the DW count of awake state is the same as itself is commissioned, there is a possibility that the Proxy Server will respond at timings at which the NAN device itself can respond, so there is a possibility that service responses will be redundant.

Note that after having performed Proxy commissioning in S1104, control may be effected to be in the awake state at DW0 alone, instead of following the table in FIG. 12. In this case, the consumption of electric power at the Proxy Client can be further reduced. Further, control may be effected in S1102 to perform Proxy commissioning in a case where there is a Proxy Server that is in an awake state in DWn in which the NAN device itself is not in an awake state, rather than being based on the DW count. That is to say, if the NAN device itself is in the awake state only in DW0 and DW1, and the Proxy Server is in the awake state only in DW0 and DW2, the DW count is the same, but commissioning the Proxy Server enables Proxy in DW2.

Further, when performing Proxy commissioning in S1104, commissioning may be performed for Proxy only in DWn when the NAN device itself is not in the awake state. At this time, information of the DWn regarding which Proxy is desired is included in the Proxy registration request such as illustrated in S613. Accordingly, the Proxy Server responds in proxy only in DWs where the NAN device itself is not capable of responding to a Subscribe, so usage of the wireless band can be reduced.

Also, an arrangement may be made to perform the determination processing of FIG. 11 regarding whether to perform Proxy commissioning or not, only in a case where the remaining battery charge is less than 50%, in the same way as with the first and second embodiments. In this case, if Proxy has been already commissioned and the remaining battery charge is 50% or more, cancellation can be performed in the same way as with the first and second embodiments.

Other Embodiments

Description has been made in the above embodiments where the NAN device 102 operates as a Proxy Server that can respond in proxy with regard to notification of services that the NAN device 101 provides. However, transmission in proxy by the Proxy function is not restricted to information of services that can be provided. For example, the NAN device 102 may accept a request for a search for a service by another device, and search for the serve instead of that device. In this case, the NAN device 102 can search for the service by transmitting a Subscribe message in proxy for the other device, and receive a Publish message that is a response thereto, for example. Note that the NAN device 102 may await a Publish message transmitted by yet another device (e.g., voluntarily), without transmitting a Subscribe message. In either case, the NAN device 102 can notify the device that has performed Proxy commissioning for the search of the service during a DW period in which that device can receive wireless signals, regarding the search results.

Also, although description has been made in the above embodiments regarding a case where the NAN device 101 has only performed Proxy commissioning to the NAN device 102, Proxy commissioning may be performed from other one or more NAN devices.

Also, an arrangement may be made in the embodiments, where, in a case where conditions for executing or cancelling Proxy commissioning have been matched, the commissioning or cancelling is not immediately performed, but rather the commissioning or cancelling is switched after the conditions continue for a certain period. For example, switching is performed by the conditions of S403 in FIG. 4, but control may be effected to perform Proxy commissioning in a case where a state of being a Non-Beaconing Device has continued for a certain period (e.g., ten minutes or the like). In a case where NAN devices frequently come and go in a NAN cluster, switching Proxy Server enabling and disabling as soon as becoming a Beaconing device may result in frequent switching of Proxy Server enabling and disabling. This is effective in such cases.

Also, the above embodiments may be combined as appropriate, and the user may be able to select which embodiment the NAN devices will be operated based on. For example, whether to advance to S404 in FIG. 4 or to advance to S1002 in FIG. 10 may be switched in accordance with the judgment results in S403 in FIG. 4, as illustrated in FIG. 13. That is to say, an arrangement may be made where Proxy commissioning is not performed in a case where the role of the NAN device 101 is a Beaconing Device, and the judgment of S1002 is performed only in a case where the role is a Non-Beaconing device.

Also, the present invention can be realized by executing the following processing. That is to say, processing where software (program) that realizes the functions of the above-described embodiments is supplied to a system or device via a network or various types of storage media, and one or more computers (or CPU or MPU or the like) of the system or device reads out and executes the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:
1. A communication device comprising:
one or more processors;
a communication interface to perform transmission and reception of wireless signals in at least one of periods of predetermined length, which arrive at a predetermined time interval; and one or more memories including instructions that, when executed by the one or more processors, cause the communication device to perform operations including:

sending a request to a particular communication device for proxy regarding at least one processing of transmission and reception of wireless signals in the at least one of the periods, wherein the particular communication device belongs to a group of a plurality of communication devices that are synchronized regarding at least one of the periods; and deciding whether or not to send the proxy request in the at least one of the periods of predetermined length by the communication device, in accordance with a frequency of the at least one of the periods of predetermined length in which the communication interface performs the transmission and reception of the wireless signals, and performing control, wherein, in a case where the communication device decides to send the proxy request, performing control includes performing control to cause the communication device to send the proxy request in the at least one of the periods of predetermined length, and wherein, in a case where the communication device decides not to send the proxy request, performing control includes performing control to cause the communication device not to send the proxy request in the at least one of the periods of predetermined length.

2. The communication device according to claim 1, wherein, in a case where, in the at least one of the periods of predetermined length, a wireless signal notifying the at least one of the periods is not being transmitted, the communication device decides to send the proxy request, and wherein, in a case where, in the at least one of the periods of predetermined length, a wireless signal notifying the at least one of the periods is being transmitted, the communication device decides not to send the proxy request.

3. The communication device according to claim 1 wherein executing the instructions further cause the communication device to perform operations including establishing a connection for the transmission and reception of the wireless signals with another communication device, in a period that is different from the periods of predetermined length and is synchronized with the predetermined time interval, wherein, in a case where the connection has not been established, the communication device sends the proxy request, and wherein, in a case where the connection has been established, the communication device decides not to send the proxy request.

4. The communication device according to claim 1, wherein executing the instructions further cause the communication device to perform operations including comparing, to obtain a comparison result, a frequency of the at least one of the periods of predetermined length in which the communication device transmits and receives wireless signals with a frequency of the at least one of the periods of predetermined length in which the particular communication device transmits and receives wireless signals, and wherein the communication device decides whether or not to send the proxy request based on the comparison result.

5. The communication device according to claim 1, wherein the wireless signals include a signal indicating a service that another communication device provides.

6. The communication device according to claim 1, wherein the wireless signals include a signal searching for a service that another communication device provides.

7. The communication device according to claim 1, wherein the periods of predetermined length are Discovery Window periods in Wi-Fi® Neighbor Awareness Networking.

8. The communication device according to claim 1, wherein the plurality of communication devices is a NAN cluster in Wi-Fi® Neighbor Awareness Networking.

9. The communication device according to claim 1, wherein the particular communication device is a communication device capable of executing at least one of the transmission and reception of the wireless signals in at least one of periods of predetermined length, in proxy.

10. A method for a communication device having a communication interface to perform transmission and reception of wireless signals in at least one of periods of predetermined length, which arrive at a predetermined time interval, the method comprising:

sending a request to a particular communication device for proxy regarding at least one processing of transmission and reception of wireless signals in the at least one of the periods, wherein the particular communication device belongs to a group of a plurality of communication devices that are synchronized regarding the; at least one of the periods;

deciding whether or not to send the proxy request in the at least one of the periods of predetermined length by the communication device, in accordance with a frequency of the at least one of the periods of predetermined length in which the communication interface performs the transmission and reception of the wireless signals; and performing control, wherein, in a case where the communication device decides to send the proxy request, performing control includes performing control to cause the communication device to send the proxy request in the at least one of the periods of predetermined length, and wherein, in a case where the communication device decides not to send the proxy request, performing control includes performing control to cause the communication device not to send the proxy request in the at least one of the periods of predetermined length.

11. A non-transitory computer-readable storage medium storing a program to cause a computer to perform a method for a communication device having a communication interface to perform transmission and reception of wireless signals in at least one of periods of predetermined length, which arrive at a predetermined time interval, the method comprising:

sending a request to a particular communication device for proxy regarding at least one processing of transmission and reception of wireless signals in the at least one of the periods, wherein the particular communication device belongs to a group of a plurality of communication devices that are synchronized regarding the; at least one of the periods;

deciding whether or not to send the proxy request in the at least one of the periods of predetermined length by the communication device, in accordance with a frequency of the at least one of the periods of predetermined length in which the communication interface performs the transmission and reception of the wireless signals; and performing control, wherein, in a case where the communication device decides to send the proxy request, performing control includes performing control to cause the communication device to send the proxy request in the at least one of the periods of predetermined length, and wherein, in a case where the communication device decides not to send the proxy request, performing control includes performing control to cause the communication device not to send the proxy request in the at least one of the periods of predetermined length.

12. The communication device according to claim 8, wherein, in a case where an own role of the communication device in the NAN cluster is Non-Master Non-Sync, the communication device decides to send the proxy request to Proxy Server of the NAN cluster, and wherein, in a case where the own role of the communication device in the NAN cluster is Master, the communication device decides not to send the proxy request to the Proxy Server of the NAN cluster.

* * * * *